(12) United States Patent
Menz et al.

(10) Patent No.: US 6,876,472 B2
(45) Date of Patent: Apr. 5, 2005

(54) OPTICAL FEATURE, IN PARTICULAR FOR DOCUMENTS OF VALUE, AND A MANUFACTURING METHOD FOR THE LATER INDIVIDUALIZATION OR DATA STORAGE

(75) Inventors: Irina Menz, Dierdorf (DE); Guenther Dausmann, Erding (DE)

(73) Assignee: Giesecke & Devrient GmbH, Munich (DE)

( * ) Notice: Subject to any disclaimer, the term of this patent is extended or adjusted under 35 U.S.C. 154(b) by 139 days.

(21) Appl. No.: 09/940,913

(22) Filed: Aug. 28, 2001

(65) Prior Publication Data

US 2002/0044313 A1 Apr. 18, 2002

(30) Foreign Application Priority Data

| Oct. 12, 2000 | (DE) | 100 50 556 |
| Nov. 9, 2000 | (DE) | 100 55 429 |
| Jul. 17, 2001 | (EP) | 01117285 |

(51) Int. Cl.$^7$ ................................................ G03H 1/00
(52) U.S. Cl. .................................... 359/2; 359/567
(58) Field of Search ....................... 359/2, 567; 283/86

(56) References Cited

U.S. PATENT DOCUMENTS

| 5,808,758 A | * | 9/1998 | Solmsdorf | 359/2 |
| 5,815,292 A | * | 9/1998 | Walters | 359/2 |
| 6,088,161 A | * | 7/2000 | Lee | 359/567 |
| 6,337,752 B1 | * | 1/2002 | Heckenkamp et al. | 359/2 |

FOREIGN PATENT DOCUMENTS

EP         0219012         4/1987

* cited by examiner

Primary Examiner—Mark A. Robinson
Assistant Examiner—Alessandro Amari
(74) Attorney, Agent, or Firm—Dilworth & Barrese LLP.

(57) ABSTRACT

The invention relates to an optical feature, in particular for documents of value, having at least one at least dual-channel hologram for the holographic reconstruction of different images from different directions of gaze, wherein different regions of the hologram are associated with the different channels and the regions of the hologram reconstructing the respective image under incident light have sub-regions which do not take part in the image reconstruction, to a data carrier having at least one optical feature of the invention and to a method for the manufacture of an optical feature, in particular for documents of value.

19 Claims, 3 Drawing Sheets

Figur 1

OPTICAL FEATURE, IN PARTICULAR FOR DOCUMENTS OF VALUE, AND A MANUFACTURING METHOD FOR THE LATER INDIVIDUALIZATION OR DATA STORAGE

The invention relates to an optical feature, in particular for documents of value, a data carrier having at least one such optical feature and a method for the manufacture of such an optical feature.

Documents, deeds, bank notes, IDs, plastic cards, etc. can today often be reproduced in exact detail and orthochromatically with the aid of modern high-resolution colour scanners and colour laser printers.

There is therefore a need to make these objects secure against forgery by additionally applied authenticity features.

Optical authenticity features can be used, for example, for this which produce a different image at different directions of gaze.

For instance, it is known from EP 0 219 012 A2 to apply a lenticular lens structure onto a data carrier and to modify the optical properties of the underlying material with the aid of a laser beam. When the laser beam is applied from a certain direction, the lenticular lens structure has an effect such that only a corresponding part region is hit by the laser light. The image produced can only be observed from a corresponding direction which corresponds to the direction of incidence of the laser beam. Applying another light pattern from a second direction of gaze in order to modify the optical properties of the underlying recording material produces an image which can be observed from the second direction. A tilt effect is achieved in this way which can only be imitated with difficulty, if at all, with, for example, a photocopying technique.

Such tilt effects can also be used independently of an increased security against forgery for the optical design of the most varied objects—either to enhance the optical impression or to carry out an individualisation.

In the method of the prior art, it is necessary to have a lenticular lens structure present both in the manufacture and in the later observation. Particularly with documents of value whose thickness is limited, such a lenticular lens structure is unwanted. In addition, this has to be applied to the material and is therefore easily susceptible to damage, e.g. scratches. Finally, the structure of a lenticular lens film can frequently not be made compatible with the demands on the flexibility of the object equipped with it.

BACKGROUND OF THE INVENTION

It is therefore the object of the present invention to provide a robust optical material which is easy to manufacture, a method for its manufacture and a data carrier having such an optical feature.

The object is satisfied by an optical feature, in particular or documents of value, having at least one at least dual-channel hologram (1) for the holographic reconstruction of different images from different directions of gaze, in which different regions (21,22) of the hologram are associated with the different channels and the regions (21,22) of the hologram (1) reconstructing the respective image under incident light (7) have subregions which do not take part in the image reconstruction, a data carrier having these features, a method for the production of an optical feature, in particular for documents of value, having the following steps:

(a) manufacture of an at least dual-channel hologram (1), with the information for the individual channels being recorded in different regions of the hologram (1);

(b1) modification of the optical properties of a sub-region of a region for the reconstruction in a direction of gaze in the form of a pattern; and (b2) repetition of step (b1) for each channel with optionally different patterns, or method for the production of an optical feature, in particular for documents of value, having the following steps:

(α1) manufacture of a first holographic structure which reconstructs a first channel of an at least dual-channel hologram (1) under incident light;

(α2) modification of the optical properties of a sub-region of the first holographic structure in the form of first pattern;

(β1) manufacture of a second holographic structure which reconstructs a second channel of the last dual-channel hologram (1) under incident light on one or more part regions of an otherwise transparent carrier material;

(β2) modification of the optical properties of a sub-region of the second holographic structure in the form of second pattern; and (γ) application of the carrier material of the second holographic structure on the first holographic structure.

Advantageous embodiments and aspects are described herein.

An optical feature of the invention comprises an at least dual-channel hologram. This hologram serves the holographic reconstruction of different images from different directions of gaze, with a dual-channel hologram making two different directions of gaze available. The hologram has regions which reconstruct on respective direction of gaze under incidence of light. Each direction of gaze, i.e. each channel, has a region associated with it, with a region serving the reconstruction of an image from one direction of gaze being able to be made up of a plurality of parts distributed over the hologram. These parts can be lines which are preferably arranged alternately for the different regions. Such an arrangement has the advantage that it can be manufactured very easily with the aid of a line mask. The individual regions for the reconstruction of a in image in one direction of gaze can equally also be optionally randomly distributed over the recording material.

The regions in turn comprise sub-regions which do not participate in the image reconstruction.

Such an optical feature allows different views if it is viewed from different directions of gaze, for example from two different directions of gaze with a dual-channel hologram. A tilt effect can be realised in this way. The design in a holographic form also makes forgery significantly more difficult. A holographic structure is very difficult to imitate in a photocopying technique. On the other hand, no additional optical structures are required to allow the observation of the different views from different directions. Compatibility with the respective carrier material is easy to achieve in this way. For example, such optical security features can be used very easily in or on plastic cards or bank notes.

An optically responding tilt effect can be generated with the use of an optical feature of the invention. When a dual-channel hologram is used, a stereoscopic effect can be generated if the individual channels represent the directions of gaze for the individual eyes of the observer.

The feature can be used to particular advantage for the increase of security against forgery of data carriers of any kind, naturally in particular of documents of value.

The sub-regions, which do not take part in the image reconstruction from the respective direction of gaze, can be arranged such that when the holographically reconstructed structure is observed, a pattern of these regions not taking part in the holographic reconstruction results which supplies recognisable information. An identification number, registration number or a corresponding image can, for example, be stored in the optical feature in this way.

The sub-regions not taking part in the image reconstruction can, for example, be blackened regions of the hologram carrier. However, a design is particularly simple and rugged in which the sub-regions not taking part in the image reconstruction are partly destroyed.

In a particular aspect, the sub-regions are partly destroyed such that a grey scale effect occurs, with a larger degree of destruction in a region effecting a different grey scale than a smaller degree of destruction.

An embodiment of the optical feature of the invention is particularly advantageous in which the recesses generated in this way are introduced into the hologram structure with a laser.

The sub-regions which are not intended to take part in the reconstruction of the image from the respective region can, in another embodiment, also be achieved by printing over the corresponding surfaces so that these no longer take part in the reconstruction from the respective region.

The regions which correspond to the holographic reconstruction of images from different directions can serve in a known manner for the holographic reconstruction of two-dimensional or three-dimensional images. In this case, shaped object beams are reconstructed in the reconstruction of the hologram.

Depending on the direction of gaze, the corresponding two-dimensional or three-dimensional structure then results which is holographically stored, with the image information coming from the sub-regions of the respective regions of the direction of gaze not taking part in the holographic reconstruction and accordingly becoming visible as a negative pattern.

A simple aspect provides that the regions for the holographic reconstruction each holographically reconstruct diffuse object beams from different directions. The negative pattern, which corresponds to the sub-regions of the holographically reconstructed regions, then stands out as if on a screen when the structure is observed from the direction of gaze associated with this region.

All kinds of hologram can be used as the hologram structure, for example volume holograms, transmission holograms or reflection holograms.

The individual regions for the reconstruction of the light in a certain direction of gaze can in turn comprise rainbow holograms which are colour separated per se in order to achieve a colour effect. Multi-colour volume holograms can also be used for the individual channels.

The use of embossed hologram structures is particularly advantageous which are simple to manufacture in mass production and which only have a low thickness.

The individual regions for the reconstruction of an image in a certain direction of gaze can each consist of a plurality of parts. These parts are preferably arranged in line form and alternately.

In another embodiment, the individual regions for the reconstruction of the light in a certain direction of gaze each comprise a plurality of parts which in turn again comprise at least one pixel. The individual parts of the regions serving the reconstruction of the light in a certain direction of gaze can here be arranged distributed over the whole surface of the optical feature and thus increase the security against forgery even more. The arrangement can take place, for example, randomly.

Such an embodiment of the optical feature of the invention therefore comprises regions which each reconstruct the light in a certain direction. These regions can each consist of a plurality of parts which are arranged distributed over the optical feature. The regions, on the other hand, comprise sub-regions which do not take part in the holographic reconstruction since they have, for example, been destroyed or blackened. Each individual region or the parts belonging to each individual region can, for example, consist in turn of colour-separated rainbow holograms. Such an optical feature has an excellent security against forgery due to the specified distribution of the information contained in the individual regions and of the additional information contained in the blackened or destroyed sub-regions.

In a further development of the optical feature, the individual regions for the reconstruction of the light in a certain direction of gaze are each a plurality of parts having at least one pixel per primary colour. Colour additional effects can be achieved in this way. Another further development provides that the pixels belonging to the individual primary colours are in turn distributed over the whole optical feature, e.g. in a random arrangement, with the aid of a computer random generator.

The hologram structure can, for example, be transparent in the sub-regions which do not take part in the holographic image reproduction. A particularly high contrast can be achieved when the hologram is applied to a dark surface.

In another advantageous embodiment, the hologram has a reflecting, preferably metallic, coating on its rear side. The optical effect is particularly bright in this way. A similar effect can be achieved when the hologram is fastened to a reflecting surface.

In a method of the invention, a hologram of at least two channels is recorded, with the information for the individual channels being recorded in different regions of the hologram. A pattern is introduced in sub-regions of the individual regions for the reconstruction of a channel in one direction of gaze due to a modification in the optical properties. This step is repeated for each channel with, optionally, different patterns. A region can here comprise a plurality of parts which are distributed on the hologram.

The processing of the exposed hologram recording material takes place, for example, in a manner known for the manufacture of holograms comprising, for example, the development process.

The multi-channel hologram manufactured with the method of the invention stores the information for different directions of gaze at different points of the hologram. If a pattern is now applied to the regions of the hologram structure, which serve the reconstruction in a corresponding direction of gaze, then only those regions are affected which belong to this direction of gaze. The modified optical properties in the sub-regions of these regions can accordingly only be seen from one direction of gaze.

The parts of the hologram structure which have to be irradiated with the light pattern and which correspond to the sub-regions of the corresponding regions for the reconstruction of one direction of gaze can, for example, be calculated with the aid of a computer. This way of proceeding is particularly advantageous when the hologram is itself also a computer-generated hologram.

However, the corresponding effect can also be achieved very simply in an optical manner. An at least dual-channel hologram is recorded, with the information of different channels begin recorded in different regions and with the different regions for the different channels being selected in the recording of the hologram by a different masking of the holographic recording material.

One possible kind of masking is, for example, the introduction of a line lattice into the beam path of the object light and/or the reference light during the recording of the hologram. In this way, only the regions of the hologram not covered by the line lattice are irradiated in the irradiation from one direction of gaze and thus the corresponding recording layer exposed.

During the exposure to object light from another direction, the masking is offset, e.g. the line lattice displaced. In this way, a different region of the hologram carrier structure is selected and exposed for the light from this direction of gaze.

It is thus realised in an easy manner that the exposure takes place at different locations of the hologram carrier structure for different directions of gaze.

In turn, the modification of the optical properties for the corresponding sub-regions, which serve the information to be represented, can be determined in the hologram structure created in this way by a computer calculation and controlled, for example, by a laser. In another aspect, the at least dual-channel hologram is, for example, irradiated by a light source, e.g. a laser diode.

The light of this light source is incident to a part of a region which serves the reconstruction in a certain direction. The light is therefore reconstructed in this direction. It can be determined in this way in which direction the region just irradiated by the light source is reconstructed. It is accordingly determined which information should be introduced in sub-regions of this region by a modification of the optical properties. The holographic structure is, for example, destroyed or blackened in the sub-regions thus determined such that it no longer takes part in the holographic reconstruction. The corresponding sub-region therefore occurs as a negative image in the part of the region. In a further step, a part of another region of the at least dual-channel hologram is irradiated by a light source and it is again observed in which direction the light reconstructs. Then the same procedure is followed as in the first step.

Naturally, a reversed beam path can also be used in the determination of which direction of gaze respectively corresponds to the part just irradiated by the light source.

The optical properties of the sub-regions which lie in the regions which belong to the reconstruction of an image and do not take part in the reconstruction itself can be generated, for example, by blackening the corresponding sub-regions. However, the effect of the invention can be achieved particularly easily if the corresponding sub-regions are partly destroyed. This can in turn be achieved very easily with the aid of a laser with which the corresponding structures are irradiated.

If the sub-regions are respectively only partly destroyed, then a grey scale effect takes place, i.e. the negative information which is contained in the partly destroyed sub-regions appears in a grey shading.

The method of the invention can be carried out by first the multi-channel hologram being fully completed and subsequently the optical properties of the corresponding sub-regions being modified in the manner claimed. In contrast to this, it is equally possible that first one channel of the hologram is recorded with a corresponding masking and directly subsequently thereto, e.g. with the aid of a laser, the optical properties of the regions belonging to this channel are modified so that they can no longer take part in the holographic reconstruction.

An optical feature of the invention can also be manufactured with a method of the invention designed as follows. First, a holographic structure is manufactured which reconstructs a channel of the at least dual-channel hologram under the incidence of light. This hologram can be exposed, developed and fixed in a known manner. For example, it can be an embossed hologram structure with a metallising coating. However, other types of hologram can also be used, including, for example, a volume hologram. The optical properties of a sub-region of the first hologram structure are modified in the form of a first pattern as already described above.

A second holographic structure is manufactured on one or more part regions of an otherwise transparent carrier material. This second hologram structure is designed such that it reconstructs the second channel of the at least dual-channel hologram under the incidence of light. The second hologram structure can here, for example, first be produced on a transparent carrier material. It can again, for example, be a metallised embossed hologram. A part of the metallisation is removed so that no holographic reconstruction takes place at these points and the material is transparent. The partly transparent regions can naturally also already be left free or otherwise made transparent in the manufacture of the second hologram structure. The second hologram structure can also comprise another type of hologram, e.g. a volume hologram.

The optical properties of a sub-region of the second hologram structure are modified in the form of a second pattern.

The carrier material prepared in this way, which is partly transparent and partly covered by the second hologram structure, is applied to, for example adhered to or embossed on the first hologram structure. The first hologram structure is thus visible in the transparent regions of the carrier material of the second hologram structure.

While the second channel of the hologram is reconstructed in the non-transparent regions of the carrier material for the second hologram structure on incidence of light, the first hologram structure, which reconstructs the first channel on the incidence of light, is visible through the transparent regions of the carrier material for the second hologram structure.

The information is additionally stored in the first channel which is stored by modification of the optical properties of a sub-region of the first hologram structure. Analogously, the information is visible in the second channel which has been stored by modification of the optical properties of the sub-regions of the second holographic structure.

An optical feature of the invention is created in this way.

If a multi-channel hologram is intended to be used, the steps for the manufacture and application of the second hologram structure are repeated correspondingly frequently.

The optical properties of the sub-regions of the respective holographic structures can be modified in the desired manner at the end of the total process. It is, however, particularly advantageous for the optical properties of the individual sub-regions of the holographic structures already to be modified before the application of the further holographic structure.

Every single holographic structure can be modified with respect to its optical properties in this way without any particular demands on the orientation in sub-regions and only subsequently to this are the individual holographic structures applied to one another. Such a method has the advantage that when the optical properties of the sub-regions of a holographic structure are modified, no account need be taken of the presence of a further holographic structure.

In a particularly advantageous aspect of the method, the first hologram structure is generated over the whole area. Such a method offers the advantage that the first hologram structure can be generated without any special observation of the spatial orientation. The partly transparent carrier material with the second hologram structure can then also be applied without any special observation of the position with respect to the first hologram structure. The manufacturing process is thereby greatly simplified.

To increase the contrast between the regions which take part in the holographic reconstruction and the sub-regions to which this does not apply, the structure can be applied to a dark background.

In another advantageous aspect of the method, the structure is applied to a reflecting background or coated on the rear side in a reflecting, preferably metallic, manner in order to achieve a brightening effect.

When the above-described metallic embossed holograms, that is embossed holograms having a metallised embossed side, are used, an at least partly dual-sided metallising is created.

In contrast to the above-described methods, the optical features of the invention can also be completely computer generated.

A simple aspect of an optical feature of the invention comprises a dual-channel hologram which allows a view from two different directions of gaze and which represents different information for these directions of gaze. Depending on the demand and the wishes, a multi-channel recording is naturally also possible which can represent different information for a correspondingly large number of channels when the directions of gaze are correspondingly adjusted.

The at least dual-channel hologram structures can, for example, be manufactured in mass production with the method of the invention. They can then be applied in or onto the documents of value and only be individualised at a later point in time, for example on the issuing of an ID document, by an identification number, for example, being subsequently introduced. To this extent, the method of the invention is particularly suited for the later individualisation of documents provided with safety features.

An optical feature in accordance with the invention can, for example, be part of a document of value, a bank note or a plastic card, e.g. a credit card. While, for example, the holographic exposure for the product is generally the same, the information to be introduced individually later for each individual product can be different, for example it can correspond to the name or an identification number of the owner.

The method of the invention is particularly suitable, for example, for the later individualisation of holographic structures by inscribing a number or another identification feature from one direction of gaze. The identification feature, for example a registration number, can then only be recognised from one direction of gaze. Another image, made in the same manner, can be shown from another direction of gaze.

Depending on the desired application, the later individualisation can comprise the modification of the optical properties of the sub-regions of only one or a plurality of regions serving the reconstruction in the respective directions of gaze. The change of the optical properties of the sub-regions of those regions serving the reconstruction in the other directions of gaze, can optionally be modified beforehand, during the manufacturing process.

BRIEF DESCRIPTION OF THE DRAWINGS

An embodiment of an optical feature of the invention and a method for its manufacture are described in the following. There are shown.

DESCRIPTION OF THE PREFERRED EMBODIMENTS

The embodiment shown represents an apparatus and a method for the particular case of a dual-channel hologram.

Figure 1:
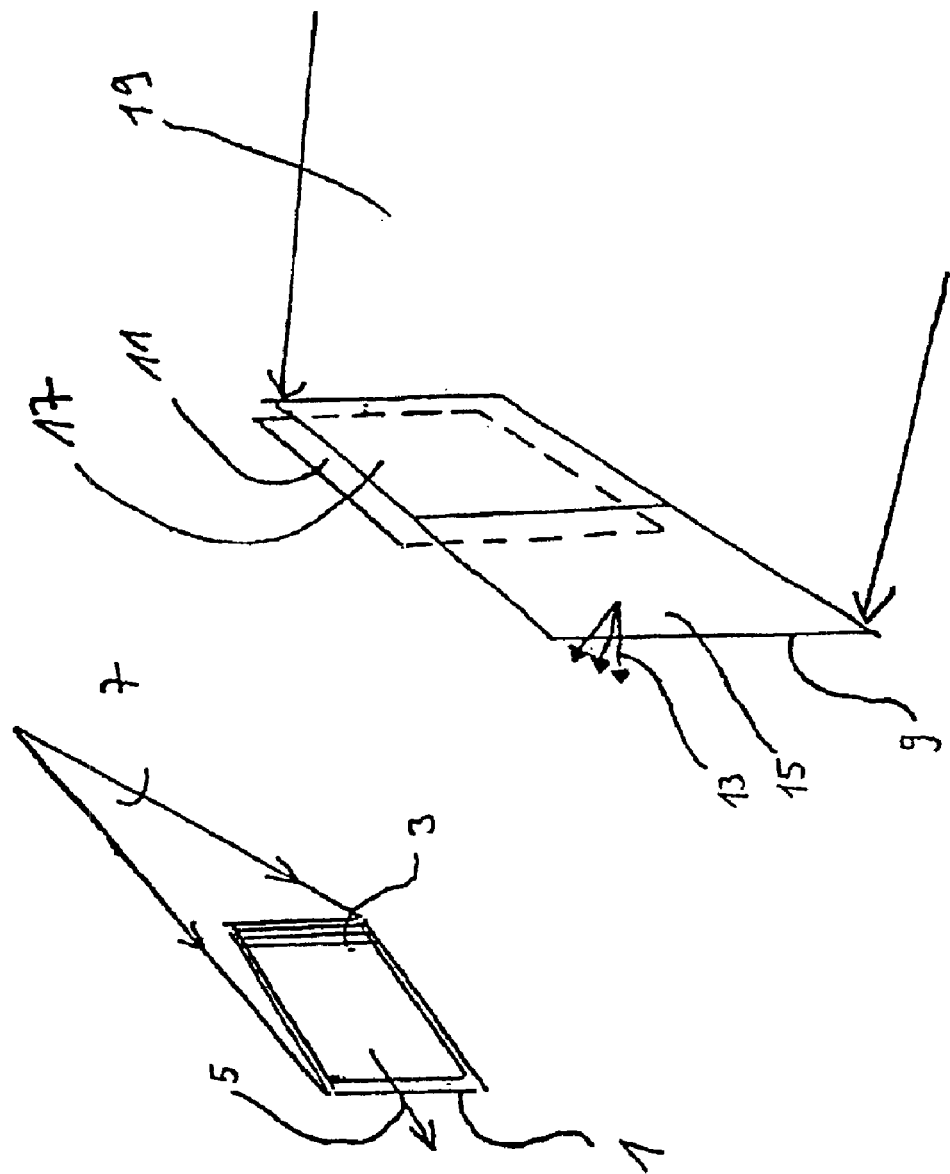
FIG. 1 a section during the manufacture of an optical feature of the invention in a schematic, perspective view.

The holographic recording material is designated with 1 in FIG. 1. A lens lattice 3 is located in front of it and is irradiated by a reference beam 7. At the same time, a screen 9 is irradiated with object light 19. The screen 9 thereby generates diffuse light 13. A shutter, which covers a part 17 of the screen 9, while the object light 19 can enter through the part 15 of the screen 9, is designated by 11.

During the exposure, the lens lattice 3 is held in one position and the overall structure is simultaneously exposed by a reference beam 7 for the generation of a holographic pattern. A holographic exposure is thereby created in a known manner by the interference of the reference beam and the object light.

It is achieved by the lens lattice 3 in front of the holographic recording material 1 that only a strip-shaped pattern from the direction of the screen part 15 is exposed. After this exposure, the lens lattice 3 is moved so that the previously non-exposed regions of the holographic structure 2 is exposed. At the same time, the shutter 11 is displaced in front of the region 15 of the screen 9 such that the region 17 of the screen 9 is exposed. On illumination with the object light 19, diffuse object light is then generated from the region 17 of the screen 9. With a simultaneous illumination of the holographic structure 1 with the displaced line lattice 3 in front of it, the object light from the now exposed region 17 of the screen 9 will then interfere with the reference beam 7 in the now exposed regions of holographic material 1 and record a corresponding holographic pattern on the holographic material 1. The displacement of the line lattice 3 between the two exposure steps is designated by 5.

The exposed holographic material 1 is then developed in the usual manner. It can, for example, be manufactured as an embossed hologram in mass production and be applied to an ID document. If this should then be individualised for a person, the optical feature is completed in a further work step.

Figure 2:
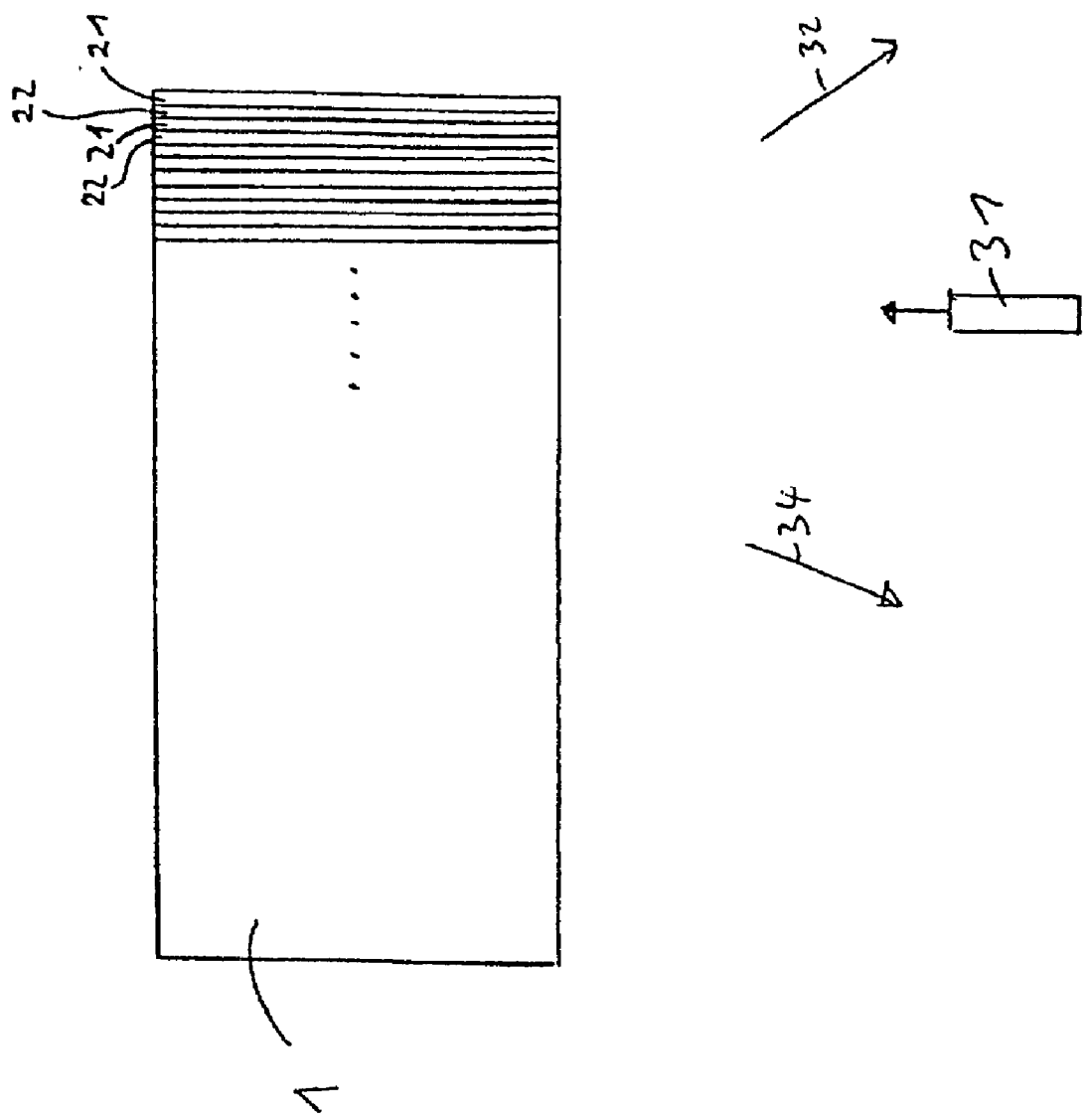
FIG. 2 a second section during the manufacture of an optical feature of the invention in a schematic, perspective view.

The further step required for this in the manufacture of the optical feature of the invention is shown schematically in FIG. 2.

The exposed and developed holographic recording material 1 comprises the individual regions 21 and 22 for the reconstruction of the light in two different directions. The regions 21 and 22 each consist of strip-like parts which are arranged alternately.

The region 21 can, for example, reconstruct the light in the direction designated by 32 when light is incident to the region 21. On the other hand, for example, the light which is incident to the region 22 can be reconstructed in the direction 34. In the example shown, in which a screen is holographically imaged from different directions in FIG. 1, the image of a screen is accordingly reconstructed in the corresponding directions.

The alternately arranged parts of the regions 21 and 22 extend here over the whole width of the holographic recording material 1. For reasons of illustration, however, only some of the parts are indicated in FIG. 2. One proceeds as follows to manufacture the information which should be stored in a negative manner in the sub-regions of the individual regions. The holographic recording material 1 is irradiated by a light source (not shown) which is focused such that it only irradiates a single part of a region, that is in the example shown only a strip. It is then determined with the aid of a detector (also not shown) in which direction this part reconstructs the light. It can be determined in this way to which region 21 or 22 the irradiated strip belongs.

A desired sub-region is then destroyed or blackened in this strip by a stronger light source, for example a laser 31. A computer file can, for example, be interrogated for this purpose.

In the following, another strip is irradiated with the aid of the light source and it is determined in which direction the reconstruction takes place. It can in turn be determined whether the irradiated part belongs to the region 21 or to the region 22 by evaluating the direction of reconstruction. Again, a corresponding desired sub-region of the strip is destroyed or blackened with the aid of the laser 31.

In FIG. 2, the region which was exposed in the step of FIG. 1 for the later reconstruction of the left hand channel is designated by 21, that of the right hand channel with 22.

Figure 3:
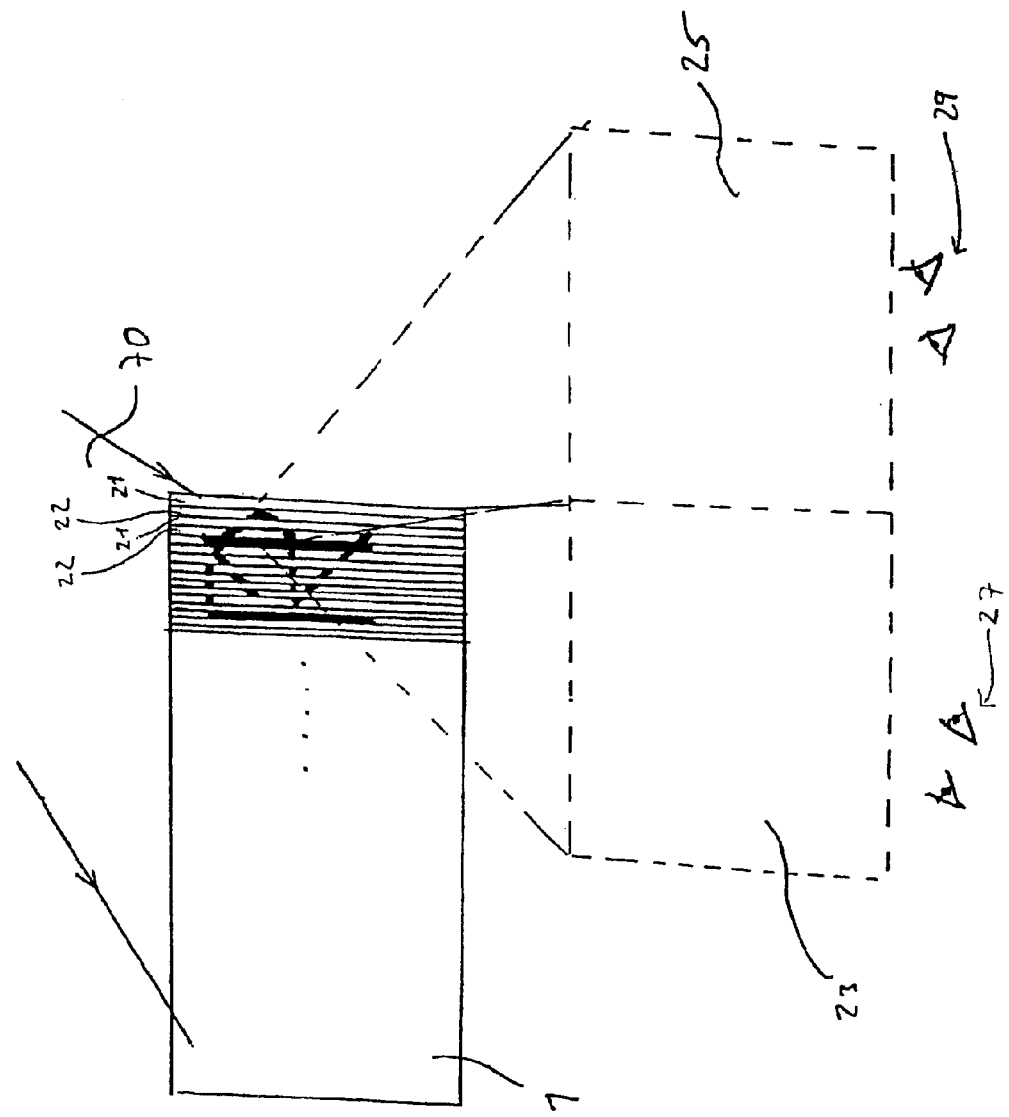
FIG. 3 the geometry in the observation of an optical feature of the invention in a schematic representation.

It is schematically shown in FIG. 3 how a feature of the invention appears in observation. The structure is illustrated only in the right hand part of the hologram 1. The holographic exposed and developed material 1, into which the information has been inscribed with the aid of the laser, is irradiated by the reconstruction beam 70. On observation from the direction of gaze of the right hand passage 25, indicated by the pair of eyes 29, the information of the right hand passage is visible. The holographically reconstructed image of the right hand part 17 of the screen 9 can be seen. For example, the information "R" has been inscribed with the laser 31 in the example shown in those regions 22 of the holographic material 1 which are responsible for the holographic reconstruction of the right hand channel. On observation from the right hand direction of gaze, the information "R" is therefore visible since it is not holographically reconstructed here. If the hologram is arranged in front of a black background, then this effect can be presented in very high contrast.

If, however, one looks onto the holographic material 1 from the direction of the left hand passage 23, indicated by the pair of eyes 27, during the irradiation with the reconstruction light 70, then one sees the holographic reproduction of the left hand part 15 of the screen 9. The information "1" has been inscribed with the aid of the laser in the example shown in the regions 21 of the holographic material 1 which have been exposed for the holographic reproduction of this part of the screen. One therefore sees the holographic reconstruction of the left hand part of the screen 9 with the information "1" in this direction of gaze.

The black regions "R" or "1" respectively are therefore the information-carrying sub-regions.

If a screen is not used during the recording of the different channels of the hologram in accordance with FIG. 1, but rather an image, then it is this image which can be reproduced holographically, with the information inscribed in the right hand or left hand channels being visible in the image depending on the direction of gaze.

An example is showed in which the holographic structure is irradiated by a reconstruction beam 70. When a corresponding selection of the hologram type is made, irradiation with white light is also possible.

The stored information can be read in different directions by tilting the feature. An electronic evaluation or also digital imaging can naturally also be feasible for authenticity verification by a corresponding electronic device which has positioned corresponding optical detectors or cameras in the directions of gaze.

If a rainbow hologram is used for each channel of the at least two-channel hologram which is manufactured in FIG. 1, then a colour effect can additionally be generated. Such a colour effect can also be achieved by a multi-colour volume hologram.

In the embodiments described, the individual parts of the regions 21, 22 are arranged in strip-shape. The parts can, however, have any shape and be distributed in a random manner over the whole hologram recording material 1.

The directions of gaze 23 and 25 of FIG. 3 can be such that they correspond to the directions of gaze for respectively one eye of an observer, in contrast to the embodiment shown in FIG. 3. A stereoscopic observation of the holographic information contained in the regions 21 and 22 can thus be achieved.

The optical feature of the invention and the method for its manufacture of the invention is very simple to carry out and increases the security against forgery due to the holographic manufacturing process. In addition, it allows a simple later individualisation of an already completed holographic structure.

Another aspect of the method of the invention for the manufacture of an optical feature of the invention such as is visible, for example, in FIG. 3, is carried out as follows. First, a first holographic structure is manufactured over the whole surface, said holographic structure being intended to serve for the reconstruction with incident light of the first channel of a, for example, dual-channel hologram. It can, for example, be an embossed hologram with a metallising coating.

The information in the form of an "R" is introduced, for example by destruction by a laser beam, into this embossed hologram layer with the aid of a laser either before or after the metallisation. If this first hologram structure is irradiated, then the image stored in the hologram is therefore created in the direction of the direction of gaze of the channel of the hologram, with "R" being left out since it does not take part in the holographic reconstruction.

Independently of this, a second holographic structure is manufactured which is intended to serve the reconstruction of the second channel of the at least dual-channel hologram. This is done on an otherwise transparent carrier material, for example, also again as an embossed hologram with a metallising layer. In turn, the information "1" is introduced into the second holographic structure with the aid of a laser, for example by the destruction of the holographic structure by the laser beam. If the second hologram structure is irradiated, then it reconstructs the information stored in the hologram in the direction of gaze of the second channel. However, the regions which correspond to the "1" have no share in the reconstruction. The information "1" is therefore in turn stored as negative information.

The second metallised embossed hologram structure manufactured in this manner is demetallised in part regions, for example by an etching process using known masking techniques. The transparent carrier material of the second hologram structure remains in these part regions. The embossing hologram structure now partly demetallised in this way is embossed onto the first hologram structure. The first hologram structure becomes visible through the transparent regions. An optical feature such as is shown in FIG. 3 can also be manufactured in this way. Other shapes and multi-channel holograms can naturally also be produced in this manner.

What is claimed is:

1. An optical security feature, having at least one at least dual-channel hologram (1) for holographic reconstruction of different images from different directions of gaze, said hologram (1) having different regions (21, 22) associated with the different channels and reconstructing the different images from the different directions of gaze, at least one of the regions (21, 22) of the hologram (1) reconstructing the respective image under incident light (7) further comprising at least one sub-region which does not take part in the image reconstruction, and the sub-regions being modified by laser or printing against participating in the image reconstruction and having modified optical properties which can also only be seen from the respective direction of gaze.

2. An optical security feature in accordance with claim 1, wherein the sub-region is arranged such that in the holographic reconstruction of the region (21, 22) to which the sub-region belongs, a recognizable image pattern or information results.

3. An optical security feature in accordance with claim 1, wherein the sub-region comprises recesses in the regions (21, 22) reconstructing the respective image under incident light.

4. An optical security feature in accordance with claim 1, wherein the at least one hologram (1) holographically reconstructs diffuse object beams from different directions.

5. An optical security feature in accordance with claim 1, wherein the at least one hologram (1) holographically reconstructs shaped object beams from different directions.

6. An optical security feature in accordance with claim 1, wherein the at least one hologram (1) comprises an embossed hologram structure.

7. An optical security feature in accordance with claim 1, wherein the regions (21, 22) for the reconstruction in different directions of gaze each comprise color-separated rainbow holograms.

8. An optical security feature in accordance with claim 1, wherein the regions (21, 22) for the reconstruction in different directions of gaze each comprise multi-color, volume holograms.

9. An optical security feature in accordance with claim 1, wherein the regions (21, 22) for the reconstruction in different directions of gaze comprise a plurality of linear alternatingly arranged parts.

10. An optical security feature in accordance with claim 9, wherein the regions (21, 22) each consists of strip-like parts alternately arranged.

11. An optical security feature in accordance with claim 1, wherein the regions each comprise a plurality of parts having at least one pixel.

12. An optical security feature in accordance with claim 11, wherein the regions for the holographic reconstruction in different directions of gaze each contain a plurality of parts having at least one pixel per primary color.

13. An optical security feature in accordance with claim 1, wherein at least one hologram (1) is designed in a reflecting manner on the rear side and comprises a rear metallic coating.

14. An optical security feature in accordance with claim 1, wherein the sub-region comprises blackenings in the regions (21, 22) reconstructing the respective image under incident light.

15. An optical security feature in accordance with claim 1, wherein the dual-channel hologram for the holographic reconstruction of two images from different directions of gaze is structured and arranges such that a stereoscopic image is produced on observation.

16. An optical security feature in accordance with claim 1, wherein the at least one hologram (1) is arranged in front of a dark background.

17. An optical security feature in accordance with claim 1, wherein the at least one hologram (1) is arranged in front of a reflecting background.

18. A data carrier having at least one optical security feature in accordance with claim 1.

19. An optical security feature in accordance with claim 1, wherein the regions (21, 22) of hologram (1) each comprise a sub-region which does not take part in the image reconstruction.

* * * * *